Dec. 10, 1929.  J. CRAIG  1,739,212
THREE-ROW GROUND ROLLER
Filed Oct. 4, 1928  3 Sheets-Sheet 1
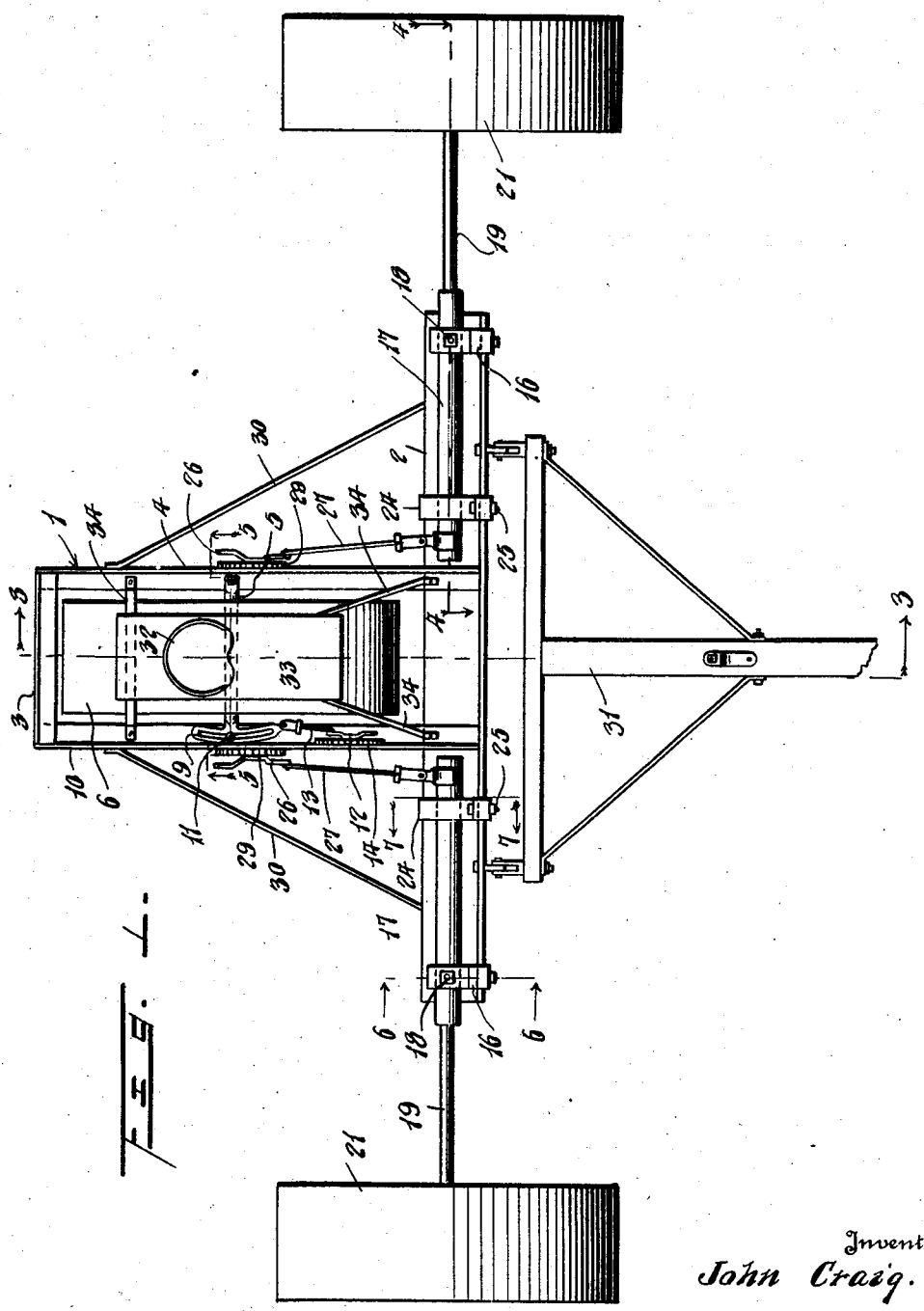
Inventor
John Craig.
By [signature]
Attorney

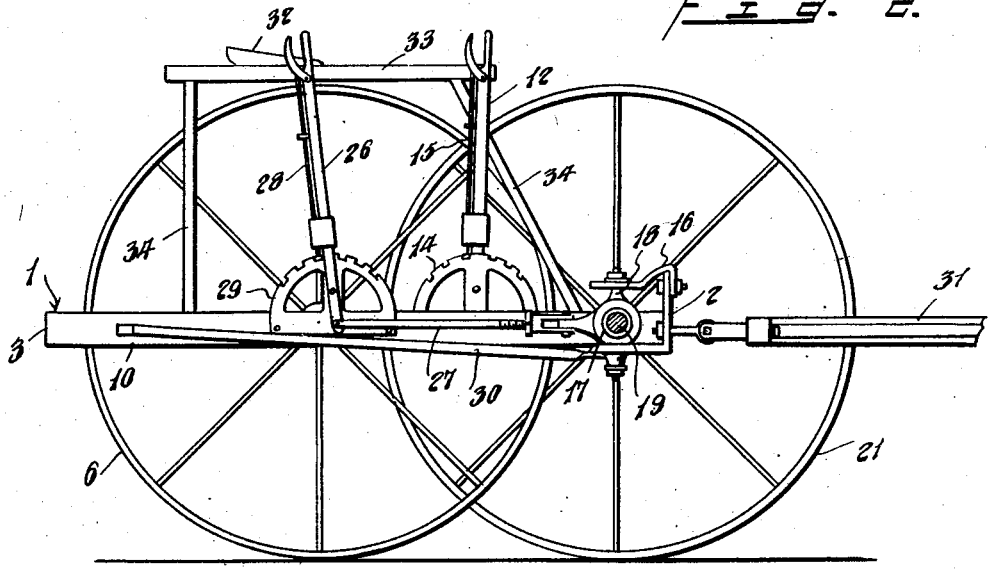
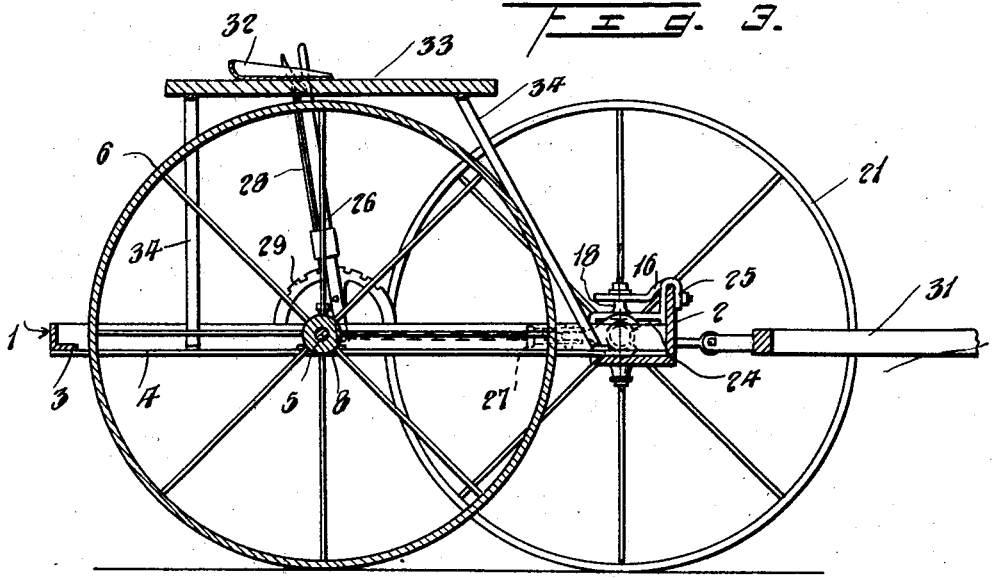

Dec. 10, 1929.  J. CRAIG  1,739,212
THREE-ROW GROUND ROLLER
Filed Oct. 4, 1928   3 Sheets-Sheet 3
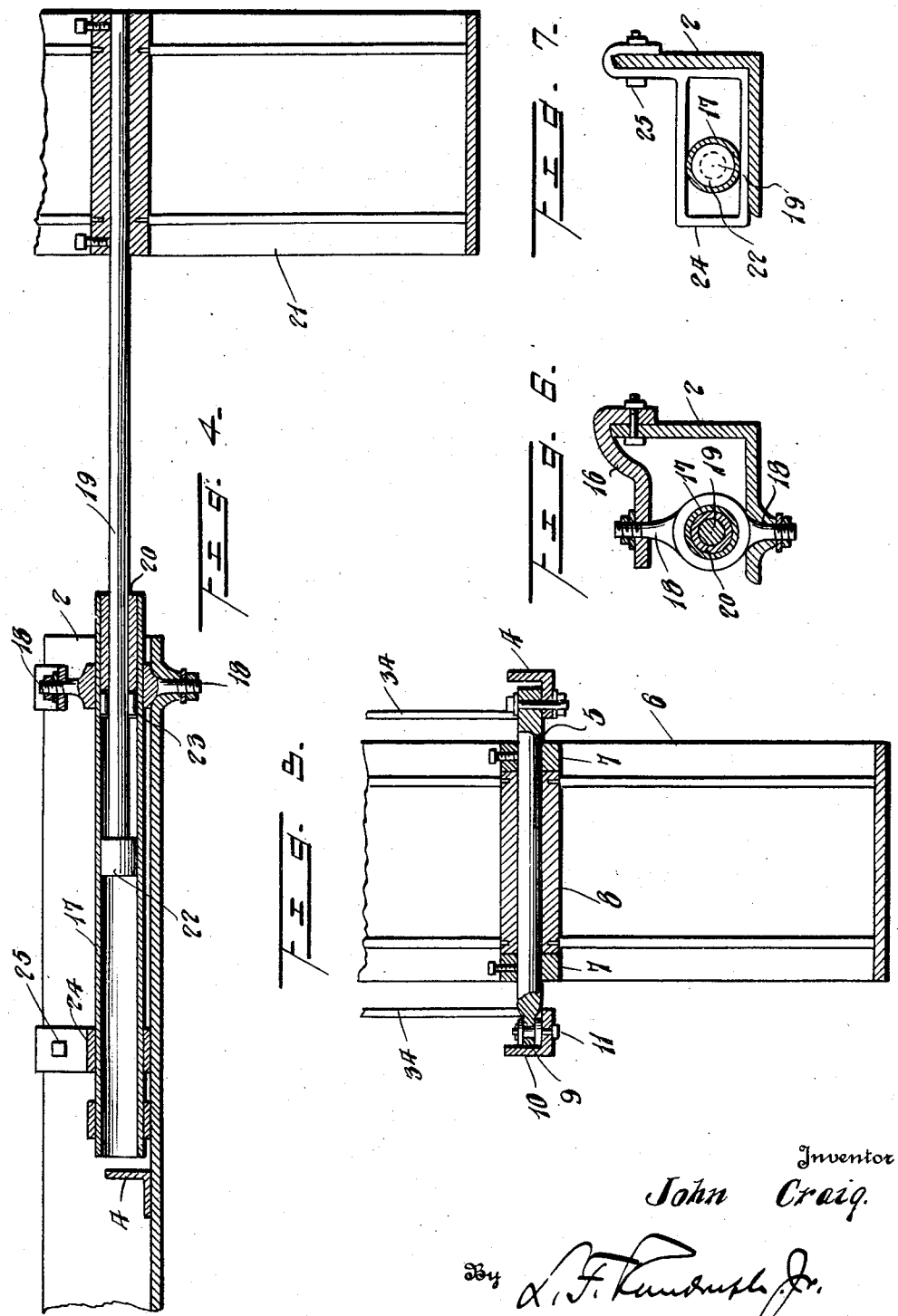
Inventor
John Craig.
By [signature]
Attorney Patented Dec. 10, 1929

1,739,212

UNITED STATES PATENT OFFICE

JOHN CRAIG, OF ALTA VISTA, KANSAS

THREE-ROW GROUND ROLLER

Application filed October 4, 1928. Serial No. 310,296.

The invention relates to a machine for rolling the ground after planting corn and other crops to thereby press the soil firmly in the corn row to provide for retaining the moisture in the soil and giving the seeds a better opportunity to germinate and also to prevent to a certain extent insects destroying the seeds before germination and also to provide a wide seed bed to catch the sun's rays and thus assist in the germination of the seeds, and has for its object the provision of means by which the rollers are adjustable to keep the rollers in the furrows.

A further object of the invention is the provision of a ground roller for the purpose stated having pivotally mounted bearing members in which the roller shafts are rotatably and slidably secured, and providing means for adjusting the bearing members to toe the rollers in or out relatively to the direction of travel of the rollers so that they will automatically adjust themselves relatively to the machine to insure following the seed furrows.

The invention will be described in detail hereinafter and will be found illustrated in the accompanying drawings in which Figure 1 is a top plan view of the improved ground roller;

Figure 2 is a side view in elevation;

Figure 3 is a sectional view on a plane indicated by the line 3—3 of Figure 1, and Figures 4, 5, 6, and 7 are detailed views on planes indicated by the lines 4—4, 5—5, 6—6, and 7—7, respectively, of Figure 1.

In the drawings similar reference characters are used to designate corresponding parts throughout the several views.

The improved ground roller is mounted on a frame 1 including a transverse angle bar 2 to which is secured an open rectangular member 3 that is preferably formed of angle bars as shown. Pivotally secured to the horizontal flange of the side bar 4 of rectangular member 3 is an axle shaft 5 on which is journaled a roller 6, 7 indicating collars secured to the shaft 5 and engaging the hub 8 of the roller 6 to hold it in position on the shaft. The free end of the axle 5 is provided with a segmental slotted member 9 that slidably engages the horizontal flange of the side member 10, and 11 indicates a pin engaging in the slots of the member 9 and on which said member slides. 12 indicates a lever that is pivotally supported on the side bar 10 and connected by means of a link 13 with the member 9, 14 indicating a notched segment that is engaged by a thumb latch 15 on the lever 12 to hold the lever and the axle 5 in adjusted position. Secured adjacent to each end of the transverse bar 2, and to the vertical flange thereof, is a bracket member 16 and 17 indicates a tubular bearing member having trunnions 18 that are pivotally supported in the transverse bar 2 and bracket 16. 19 indicates shafts that are journaled in bushings 20 in the outer ends of the tubular bearing member 17 and on which are mounted ground rollers 21, said ground rollers being secured to the shafts. The ends of the shafts within the tubular bearing member 17 are provided with sleeves or enlargements 22 that by engaging the bearings 23 adjacent to the bushings 20 will limit the outwardly sliding movement of the shafts 19. 24 indicates guide members secured as shown at 25 to the vertical flange of the transverse bar 2 in which the tubular bearing members 17 are slidably mounted. 26 indicate levers fulcrumed on the side members 4 and 10 of the rectangular member 3 and connected by means of links 27 with the free ends of the tubular bearing members 17 to adjust said bearing members on the trunnions 18 for the purpose hereinafter stated. Levers 26 are provided with thumb latches 28 that engage in segments 29 to hold the levers 26 and the tubular bearing members in adjusted positions. 30 indicate brace bars connecting the transverse bar 2 with the sides of the rectangular member 3, 31 is the draft pull for the machine, and 32 is a seat for the driver and operator that is mounted on a platform 33 supported by the rectangular member 3 by means of a supporting member 34.

In operation it will be apparent that as the levers 12 and 26 are arranged conveniently for operation by the driver of the vehicle, the rollers 6 and 21 may be adjusted by adjusting the levers 12 and 26 so that the rollers will at all times follow the seed furrows and also that the rollers may be adjusted for turning the machine at the end of the field by adjustment of the rollers. It will be furthermore understood that by toeing in the rollers 21 the shafts 19 will slide inwardly of the frame, while by toeing the rollers 21 outwardly of the frame a drag on the rollers will slide the shafts 19 outwardly of the frame so that by properly manipulating the levers 26 operator may be sure that the rollers 21 will at all times follow the seed furrows on either side of the machine and the distance between the rollers 21 may be adjusted to insure following the seed furrows at varying distances from the center of the machine and from the rollers 6.

What is claimed is:—

1. In a ground roller, a supporting frame, a bearing member pivotally mounted on the frame, a shaft slidably and rotatably mounted on said member, a roller secured to said shaft, and means to adjust the position of said bearing member to incline the shaft forwardly and rearwardly of the frame to slide the shaft in said bearing.

2. In a ground roller, a supporting frame including a transverse bar, a bearing member pivotally mounted on said bar, a shaft slidably and rotatably mounted in said member, a roller secured to the shaft, a lever fulcrumed on the frame, and a link pivotally connecting said lever and bearing member, said bearing member being adjustable to incline the shaft forwardly and rearwardly of the frame to slide the shaft in said bearing.

3. A ground roller, including a frame having a transverse bar and an open rectangular member secured thereto, tubular bearing members pivotally mounted at the ends of said bar, a shaft slidably and rotatably mounted in each tubular member, means to limit the sliding movement of said shafts relatively to the tubular members, ground rollers secured to said shafts, levers fulcrumed on said rectangular member, links connecting said levers and the free ends of the tubular members, said tubular members being adjustable to incline the shafts forwardly and rearwardly of the frame to toe the rollers inwardly or outwardly of the frame and slide the shafts relatively to the tubular members, an axle pivotally secured to one side of the rectangular member, a roller journaled on said axle, a lever fulcrumed on the frame, and a link connecting the lever and the free end of the axle to adjust the roller in said member.

In testimony whereof I affix my signature.

JOHN CRAIG.